(12) United States Patent
Liu et al.

(10) Patent No.: US 12,169,945 B2
(45) Date of Patent: Dec. 17, 2024

(54) METHOD AND APPARATUS FOR ESTIMATING POSE OF DEVICE

(71) Applicant: SAMSUNG ELECTRONICS CO., LTD., Suwon-si (KR)

(72) Inventors: Zhihua Liu, Beijing (CN); Hongseok Lee, Seoul (KR); Qiang Wang, Beijing (CN); Yuntae Kim, Suwon-si (KR); Kuan Ma, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 17/690,219

(22) Filed: Mar. 9, 2022

(65) Prior Publication Data

US 2022/0292715 A1    Sep. 15, 2022

(30) Foreign Application Priority Data

Mar. 9, 2021 (CN) .................... 202110257474.4
Nov. 23, 2021 (KR) .................... 10-2021-0162793

(51) Int. Cl.
*G06T 7/73* (2017.01)
*G06V 10/42* (2022.01)
*G06V 10/44* (2022.01)
*G06V 10/74* (2022.01)

(52) U.S. Cl.
CPC ............ *G06T 7/74* (2017.01); *G06V 10/42* (2022.01); *G06V 10/44* (2022.01); *G06V 10/761* (2022.01)

(58) Field of Classification Search
None
See application file for complete search history.

(56) References Cited

U.S. PATENT DOCUMENTS

| 7,145,478 | B2* | 12/2006 | Goncalves | G05D 1/0274 |
| | | | | 340/988 |
| 10,417,781 | B1* | 9/2019 | Konolige | G06F 16/5854 |
| 2019/0259170 | A1* | 8/2019 | Qi | G06T 7/73 |
| 2020/0011668 | A1* | 1/2020 | Derhy | A61B 1/000094 |
| 2020/0026287 | A1 | 1/2020 | Jiang et al. | |
| 2020/0175311 | A1* | 6/2020 | Xu | G06V 10/82 |

(Continued)

FOREIGN PATENT DOCUMENTS

CN    110533722 A    12/2019

OTHER PUBLICATIONS

Mur-Artal et al., "ORB-SLAM: A Versatile and Accurate Monocular SLAM System", IEEE Transactions On Robotics, vol. 31, No. 5, Oct. 2015, XP011670910, (17 pages total).

(Continued)

*Primary Examiner* — Tsung Yin Tsai
(74) *Attorney, Agent, or Firm* — Sughrue Mion, PLLC

(57) ABSTRACT

The present disclosure relates to the field of artificial intelligence technology, and to a method of estimating a pose of a device and a related device. The method of estimating a pose of a device includes identifying a similar key frame that is similar to a current frame collected by the device from a key frame set, based on a vector distance between the similar key frame and the current frame; obtaining data-related information between image frames based on a feature matching relationship between the current frame and the similar key frame; and obtaining the pose of the device based on the data-related information.

16 Claims, 10 Drawing Sheets

(56) References Cited

U.S. PATENT DOCUMENTS

| | | | | |
|---|---|---|---|---|
| 2020/0193623 | A1* | 6/2020 | Liu | G06N 3/04 |
| 2020/0218929 | A1* | 7/2020 | Li | G06V 20/10 |
| 2020/0302615 | A1* | 9/2020 | Lin | G06T 17/00 |
| 2020/0342270 | A1 | 10/2020 | Biswas et al. | |
| 2020/0364554 | A1* | 11/2020 | Wang | G06T 7/11 |
| 2022/0172386 | A1* | 6/2022 | Liu | G06T 7/73 |

OTHER PUBLICATIONS

Rublee et al., "ORB: an efficient alternative to SIFT or SURF", 2011 IEEE International Conference on Computer Vision, XP032101497, (8 pages total).

Cao et al., "Unifying Deep Local and Global Features for Image Search", Computer VISION-ECCV 2020: 16$^{th}$ European Conference, XP047588754, (18 pages total).

Shorten et al., "A Survery on Image Data Augmentation for Deep Learning", Journal of Big Data, vol. 6, No. 1, Jul. 6, 2019, XP055850083, https://doi.org/10.1186/s40537-019-0197-0, (48 total pages).

Communication issued Aug. 4, 2022 by the European Patent Office in European Patent Application No. 22159874.1.

Anonymous CVPR submission, "PixelCL: Boosting the Image Retrieval Performance via Pixel-level Contrastive Learning," CVPR 2022 Submission Paper ID 11818, 2022, Total 10 pages.

Liu et al., "ICE-BA: Incremental, Consistent and Efficient Bundle Adjustment for Visual-Inertial SLAM," CVPR paper, pp. 1974-1982, 2018.

Cao et al., "Unifying Deep Local and Global Features for Image Search," arXiv:2001.05027v4 [cs.CV], Sep. 2020, Total 25 pages.

Balntas et al., "HPatches: A benchmark and evaluation of hand-crafted and learned local descriptors," arXiv:1704.05939v1 [cs.CV], Apr. 2017, Total 10 pages.

Zou et al., "Learning Monocular Visual Odometry via Self-Supervised Long-Term Modeling," arXiv:2007.10983v1 [cs.CV], Jul. 2020, Total 25 pages.

Shen et al., "Beyond Photometric Loss for Self-Supervised Ego-Motion Estimation," arXiv:1902.09103v1 [cs.CV], Feb. 2019, Total 7 pages.

* cited by examiner

INTER-FRAME TRACKING BASED ON OPTICAL FLOW METHOD

TRACKING BASED ON FEATURE POINT MATCHING BETWEEN
CURRENT FRAME AND PREVIOUS FRAME OR REFERENCE KEY FRAME

METHOD AND APPARATUS FOR ESTIMATING POSE OF DEVICE

CROSS-REFERENCE TO RELATED APPLICATIONS

This application claims the benefit of Chinese Patent Application No. 202110257474.4, filed on Mar. 9, 2021, in the State Intellectual Property Office (SIPO) of the People's Republic of China and Korean Patent Application No. 10-2021-0162793, filed on Nov. 23, 2021, in the Korean Intellectual Property Office, the disclosures of which are incorporated herein in their entireties by reference.

BACKGROUND

1. Field

The present disclosure relates to the field of artificial intelligence (AI) technology, and more particularly, to a method and apparatus for estimating a pose of a device based on AI technology.

2. Description of the Related Art

As artificial intelligence technology develops, artificial intelligence technology has been used importantly in various fields such as autonomous driving, robot navigation, and augmented reality. In this field, estimating a pose of a device is usually implemented by adopting a simultaneous localization and mapping (SLAM) technique.

The SLAM technique may estimate a pose of a device by searching for data correlation between two images collected by the device.

In an existing art, the SLAM technique generally establishes data correlation between two images by tracking through an optical flow method and a characteristic point method. However, because the tracking method is limited by the expression performance of a feature point, it may not be possible to accurately search for data correlation between image frames. This affects the stability and accuracy of the SLAM technique in the device pose estimation.

SUMMARY

One or more example embodiments provide methods and apparatuses for estimating a pose of a device, which are capable of securing the stability and accuracy of simultaneous localization and mapping (SLAM) technique.

The problems to be solved through the embodiments of the present disclosure are not limited to the above-mentioned problems, and the problems not mentioned are clearly understood by those of ordinary skill in the art to which the embodiments belong from the present disclosure and the accompanying drawings.

Additional aspects will be set forth in part in the description which follows and, in part, will be apparent from the description, or may be learned by practice of the presented embodiments of the disclosure.

According to an aspect of the present disclosure, there is provided a method of estimating a pose of a device, the method including: identifying a similar key frame that is similar to a current frame collected by the device from a key frame set, based on a vector distance between the similar key frame and the current frame; obtaining data-related information between image frames based on a feature matching relationship between the current frame and the similar key frame; and obtaining the pose of the device based on the data-related information.

The identifying of the similar key frame may further include: determining a first similarity between each key frame in the key frame set and the current frame based on a global feature of the current frame; determining a second similarity between each key frame in the key frame set and the current frame based on a local feature of the current frame; and identifying the similar key frame based on the first similarity and the second similarity.

The obtaining of the data-related information may include: performing inter-frame feature matching on the current frame to obtain first data-related information between the image frames; and updating the first data-related information based on the feature matching relationship between the current frame and the similar key frame to obtain second data-related information between the image frames.

The first data-related information may include a matching relationship between features of the image frames, and wherein the updating the first data-related information may include: determining whether the features of the image frames are same features based on the feature matching relationship between the current frame and the similar key frame; combining the same features based on a result of the determination; and updating the first data-related information to obtain the second data-related information, based on the combined same features.

The similar key frame may be obtained from the key frame set, through an image feature extraction model that is trained using an original image, a modified image that is obtained by rotating or flipping the image, and a global feature and a local feature that are extracted from each of the original image and the modified image.

The method may further include: obtaining a first local feature and a first global feature of the original image through the image feature extraction model; obtaining a second local feature of the modified image through a target model, and performing a conjugate rotation flip on the second local feature of the modified image to obtain a conjugate rotation-flipped local feature of the modified image; obtaining a local feature pair based on the first local feature of the original image and the conjugate rotation-flipped local feature of the modified image; and updating parameters of the image feature extraction model based on the local feature pair and the first global feature.

According to an aspect of the present disclosure, there is provided an apparatus for estimating a pose of a device, the apparatus including: a memory storing computer readable instructions; and at least one processor configured to execute the computer readable instructions to: identify a similar key frame that is similar to a current frame collected by the device from a key frame set, based on a vector distance between the similar key frame and the current frame; obtain data-related information between image frames based on a feature matching relationship between the current frame and the similar key frame; and obtain the pose of the device based on the data-related information.

The at least one processor may be further configured to: determine a first similarity between each key frame in the key frame set and the current frame based on a global feature of the current frame; determine a second similarity between each key frame in the key frame set and the current frame based on a local feature of the current frame; and identify the similar key frame based on the first similarity and the second similarity.

The at least one processor may be further configured to: perform inter-frame feature matching on the current frame to obtain first data-related information between the image frames; and update the first data-related information based on the feature matching relationship between the current frame and the similar key frame to obtain second data-related information between the image frames.

The first data-related information may include a matching relationship between features of the image frames, and the at least one processor may be further configured to: determine whether the features of the image frames are same features based on the feature matching relationship between the current frame and the similar key frame; combine the same features based on a result of the determination; and update the first data-related information to obtain the second data-related information, based on the combined same features The at least one processor may be further configured to: obtain the similar key frame from the key frame set, through an image feature extraction model that is trained using an original image, a modified image that is obtained by rotating or flipping the image, and a global feature and a local feature that are extracted from each of the original image and the modified image.

The at least one processor may be further configured to: obtain a first local feature and a first global feature of the original image through the image feature extraction model; obtain a second local feature of the modified image through a target model, and performing a conjugate rotation flip on the second local feature of the modified image to obtain a conjugate rotation-flipped local feature of the modified image; obtain a local feature pair based on the first local feature of the original image and the conjugate rotation-flipped local feature of the modified image; and update parameters of the image feature extraction model based on the local feature pair and the first global feature.

According to an aspect of the present disclosure, there is provided a non-transitory computer-readable storage medium storing a program that is executable by at least one processor to perform a method of estimating a pose of a device, the method including: identifying a similar key frame that is similar to a current frame collected by the device from a key frame set, based on a vector distance between the similar key frame and the current frame; obtaining data-related information between image frames based on a feature matching relationship between the current frame and the similar key frame; and obtaining the pose of the device based on the data-related information.

The identifying of the similar key frame may include: determining a first similarity between each key frame in the key frame set and the current frame based on a global feature of the current frame; determining a second similarity between each key frame in the key frame set and the current frame based on a local feature of the current frame; and identifying the similar key frame based on the first similarity and the second similarity.

The obtaining of the data-related information may include: performing inter-frame feature matching on the current frame to obtain first data-related information between the image frames; and updating the first data-related information based on the feature matching relationship between the current frame and the similar key frame to obtain second data-related information between the image frames.

The first data-related information includes a matching relationship between features of the image frames, and the updating the first data-related information may include: determining whether the features of the image frames are same features based on the feature matching relationship between the current frame and the similar key frame; combining the same features based on a result of the determination; and updating the first data-related information to obtain the second data-related information, based on the combined same features.

The similar key frame may be obtained from the key frame set, through an image feature extraction model that is trained using an original image, a modified image that is obtained by rotating or flipping the image, and a global feature and a local feature that are extracted from each of the original image and the modified image.

The method may further include: obtaining a first local feature and a first global feature of the original image through the image feature extraction model; obtaining a second local feature of the modified image through a target model, and performing a conjugate rotation flip on the second local feature of the modified image to obtain a conjugate rotation-flipped local feature of the modified image; obtaining a local feature pair based on the first local feature of the original image and the conjugate rotation-flipped local feature of the modified image; and updating parameters of the image feature extraction model based on the local feature pair and the first global feature.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
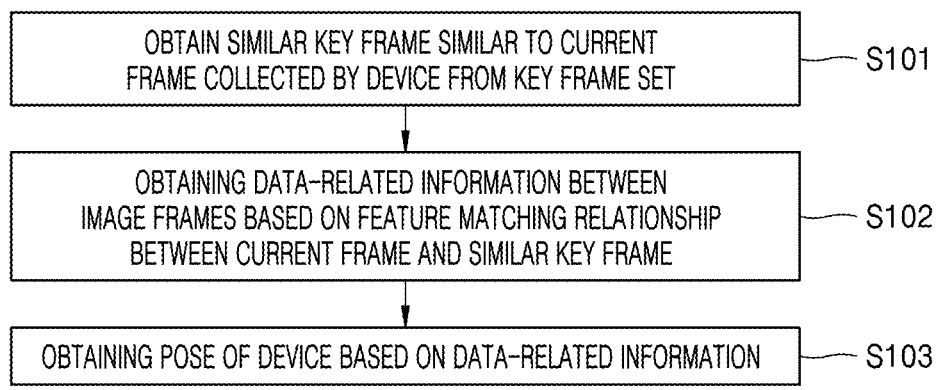
FIG. 1 is a flowchart of a method of estimating a pose of a device, according to an example embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

In the descriptions of the embodiments, it will be understood that, when an element is referred to as being connected to another element, it may include electrically connected when the element is directly connected to the other element and when the element is indirectly connected to the other element by intervening a constituent element. Also, it should be understood that, when a part "comprises" or "includes" a constituent element in the specification, unless otherwise defined, it is not excluding other elements but may further include other elements.

It will be further understood that the term "comprises" or "includes" should not be construed as necessarily including various constituent elements and various operations described in the specification, and also should not be construed that portions of the constituent elements or operations of the various constituent elements and various operations may not be included or additional constituent elements and operations may further be included.

It will be understood that, although the terms 'first', 'second', etc. may be used herein to describe various constituent elements, these constituent elements should not be limited by these terms. These terms are only used to distinguish one constituent element from another.

The descriptions of the embodiments should not be interpreted as limiting the scope of right, and embodiments that are readily inferred from the detailed descriptions and embodiments by those of ordinary skill in the art will be construed as being included in the inventive concept.

In order to help the understanding and description of a solution provided in the embodiments of the present disclosure, the following will first describe related technology mentioned in the present disclosure.

Artificial Intelligence (AI) refers to theory, methods, techniques, and applied systems that imitate, extend and/or expand human intelligence, perceive an environment, and acquire knowledge by using a digital computer or digital computer-controlled machine and use the knowledge to achieve best results.

AI software technology mainly includes several big directions, such as computer vision technology, language processing technology, natural language processing technology, and machine learning/deep learning.

Embodiments of the present disclosure relate primarily to computer vision technology.

In a technique for estimating a pose of a device, disclosed in the present disclosure, the device pose estimation is generally implemented by simultaneous localization and mapping (SLAM). Examples of the device may include a robot, a target object that is to be controlled or manipulated by the robot or is located in a travel path of the robot, or a camera mounted on the robot or provided separately provided from the robot to capture an image of the robot or an image of an environment where the robot is located, but the examples of the device are not limited thereto.

The problem of dealing with the SLAM may be described as whether it is possible to draw a complete map of an unknown environment step by step while placing a robot in an unknown location in the unknown environment and moving the robot. A consistent map refers to each corner that may be entered by marching into an area without obstacles.

Specifically, the SLAM may capture inputs from various sensors (e.g., a LiDAR, a camera, an Inertial Measurement Unit (IMU), a Global Positioning System (GPS), and a depth sensor (Kinect)) in real time, thereby building a three-dimensional scene or map while estimating a pose in real time.

Such SLAM technique may be widely used in autonomous driving, robot navigation, and augmented reality fields.

In this case, the camera may obtain richer texture information and may be widely used in a SLAM system because the camera is not affected by the distance or blockage by buildings.

In the SLAM technique, an operation of identifying and retrieving related two images (e.g., frame images) may affect the accuracy of SLAM system camera tracking and may also affect the robustness of tracking in the SLAM system.

In the related art, the SLAM system performs tracking through an existing optical flow method and a feature point method. In the SLAM system, it is often limited by the expression performance of a feature point, which may result in long term tracking of one feature point being divided into multiple short term tracking. In this case, data relation between image frames may not be accurately retrieved, which may affect the stability and accuracy of the SLAM system.

In order to solve the above technical problem, the present disclosure provides a method of estimating a pose of a device via a feature matching relationship between a current frame and a similar key frame. The method of estimating a pose of a device, according to embodiments of the present disclosure, may accurately search for data-related information between image frames through a feature matching relationship between a current frame and a similar key frame. Accordingly, the method of estimating a pose of a device, according to embodiments of the present disclosure, improves the robustness of image frame tracking, and helps to improve the accuracy and calculation speed of pose estimation.

In addition, the method of estimating a pose of a device, according to embodiments of the present disclosure, may improve the accuracy of pose estimation by applying an image search technique to a SLAM system.

In this case, the image search technique may mean searching for the most similar image by calculating similarity between any two images.

However, in the related image search technique, search may be conducted by using only a global feature or geometric verification may be performed by using a local feature. In this case, the image search technique using only a global feature may have relatively low accuracy, and the image search technique using a local feature may have relatively high time complexity.

In order to solve the above technical problem and improve the expression performance of a global feature and/or local feature, a technique provided in the present disclosure may improve the accuracy of obtaining a similar key frame similar to a current frame, collected by the device in a key frame set, by learning a global feature and a local feature in a current frame extracted by an image feature extraction model obtained by further adopting a method based on a joint learning of a global feature and a local feature.

In addition, existing data sets often only have image-level annotations, and thus may only be used to learn a global feature. For data sets annotated on local feature correspondences, the data sets may often be relatively small because the data sets are often limited by the cost of annotations and the difficulty of data acquisition. In other words, existing methods could not solve the requirements for data sets in joint learning of a global feature and a local feature.

Therefore, a key to solving technical challenges in angular transformation of data sets is how to generate image pairs that is capable of being used for local feature learning.

In this case, the image pairs are characterized in that (1) there is a correspondence of pixels between image pairs and (2) there is a sufficient difference between the image pairs and local feature pairs corresponding thereto.

In the case of learning a local feature in existing arts, image pairs obtained by calculating in advance is generally used.

In order to solve the above technical problem, the present disclosure may provide a conjugate random rotation flip algorithm, based on a learning method of a proposed image feature extraction model. The provided conjugate random rotation flip algorithm may simultaneously provide global and local image pairs required for global and local feature joint learning on a data set with image level annotations. Accordingly, embodiments of the present disclosure may improve the efficiency of global and local feature joint learning on a data set with only image level annotations.

In order to more clearly explain the object, technical solution, and advantage of the present disclosure, below, with reference to specific embodiments and the accompanying drawings, it will be described in detail how the above technical problem is solved by each optional implementation method of the present application and a technical solution method of the embodiments of the present disclosure.

Hereinafter, several specific embodiments may be combined with each other, and the same or similar concepts or processes will not be described in detail in certain embodiments.

Hereinafter, embodiments of the present disclosure will be described with reference to the accompanying drawings.

Hereinafter, the method of estimating a pose of a device will be described with reference to FIGS. 1, 2 and 3.

As shown in FIG. 1, the method of estimating a pose of a device, according to an example embodiment of the present disclosure, may include operations S101 to S103.

In operation S101, the method of estimating a pose of a device includes obtaining a similar key frame similar to a current frame collected by the device from a key frame set.

Specifically, the device may include a camera, a mobile imaging device, or the like. The camera may be mounted on a mobile device such as a cleaning robot or a wearable device. The pose of the camera may correspond to the pose of a device (e.g., a robot) having the camera mounted thereon.

In this case, the current frame collected by the device may be image data collected by the device in real time. For example, the current frame may be image data captured by a cleaning robot while the cleaning robot moves.

In this case, the key frame set may include a plurality of key frames generated by history data for performing pose estimation.

The key frame set may be built by employing the SLAM technique. Specifically, the key frame set may be built through the following method. First, feature points of an input image of an image acquisition device (a process is expressed by a current frame and a previous frame) may be collected or extracted. Next, the number of feature points tracked between a current frame image and a previous frame image may be updated, and key frames included in the key frame set may be updated.

The key frame set may constitute a global map in the SLAM system. Depending on embodiments, the global map may be referred to as a 'key frame map'.

Figure 4:
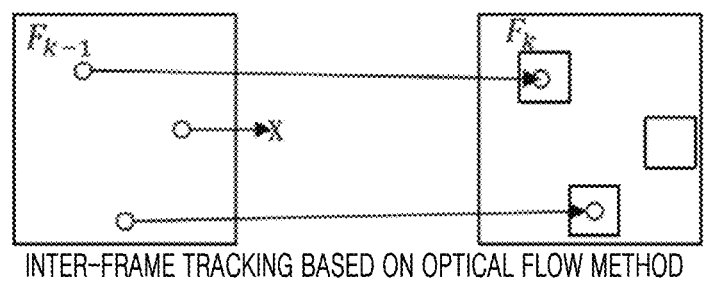
FIG. 4 is a schematic diagram of a feature matching operation between frames based on an optical flow method and a feature point method, according to an example embodiment of the present disclosure.
Figure 4:
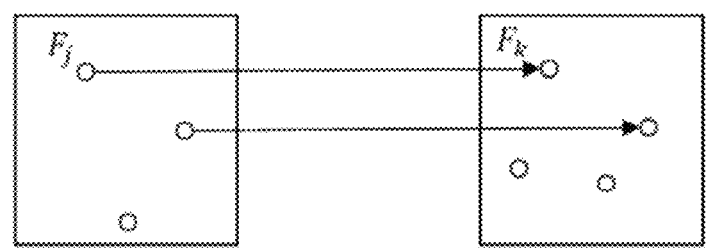

In this case, as shown in FIG. 4, before describing the building of the key frame set, a method of implementing tracking for the feature points of the input image will be described first. Specifically, the method of implementing the tracking may be carried out through any one of the following two methods.

Method 1. Tracking based on feature point matching between a current frame and a previous frame or reference key frame: a descriptor corresponding to a feature point (e.g., $F_k$) such as Oriented FAST and Rotated BRIEF (ORB) is extracted from an input image, and a feature point matching relationship between two frames before and after is obtained by comparing the extracted descriptor (e.g., a descriptor for feature point $F_k$) with a descriptor of an input image of the previous frame (e.g., a descriptor for feature point $F_j$).

The reference key frame generally refers to the latest key frame, in a time sequence, in a key frame set.

Method 2. Inter-frame tracking based on an optical flow method: Through feature points (e.g. $F_{k-1}$) of a previous frame image, corresponding feature points (e.g. $F_k$) on a current frame (i.e., an image frame currently being processed from among input images) are searched for by the optical flow method, and a feature point matching relationship between two frames before and after may obtained by selecting wrong feature point (e.g., X) matching through a descriptor.

When the number of matched feature points obtained on the current frame is less than a set threshold, a key point and a descriptor are extracted again from the current frame.

In this case, in SLAM system processing, a feature point may include a key point and a descriptor. In this case, the key point may mean the position of the feature point in an image, and the descriptor may mean the direction of the key point and information about surrounding pixels.

Specifically, it is determined whether or not to use the current frame as a key frame through a tracking state comparison between the two frames before and after. When the current frame is used as a key frame, a current image may be added to a key frame set and may be used for bundle adjustment, loop closure detection, and a repositioning module, which are described below.

When determining a tracking state between the two frames before and after, the number of feature points tracked in the current frame and the number of newly extracted feature points (i.e., feature points newly extracted from the current frame when the number of matched feature points obtained on the current frame is less than the set threshold value) may be compared to each other, and when the number of feature points tracked in the current frame is less than a given value or the number of newly extracted feature points exceeds a given value, the current frame may be used as a key frame in the key frame set.

Key frames included in the key frame set may be updated in real time according to obtained input data. When using the current frame as a key frame, the current frame is stored in the key frame set.

Specifically, the similar key frame may mean a key frame having similarity to the current frame. By performing an image search in the key frame set based on the current frame, a key frame having a relatively high similarity may be obtained and used as a similar key frame similar to the current frame. For example, a vector distance, such as an Euclidean distance or a cosine distance, between pixels from the key frame and the current frame in a feature space may be computed to measure a similarity between the key frame and the current frame. When the Euclidean distance or the cosine distance is less than a threshold distance, the key frame may be determined to be similar to the current frame. The similar key frame is not limited to an image frame with one frame and may be an image frame with multiple frames.

In operation S102, the method of estimating a pose of a device may include obtaining data-related information between image frames based on a feature matching relationship between the current frame and the similar key frame.

Specifically, the method of estimating a pose of a device may include obtaining the current frame and the similar key frame, extracting features of the current frame and the similar key frame, and determining a feature matching relationship between the current frame and the similar key frame by performing feature matching based on the extracted features.

The extracted features may include features such as a point, a line, and a plane, but are not limited thereto.

In this case, the features may include a key point extracted when extracting a feature point and a descriptor. Based on this, feature matching may include key point matching.

Specifically, when data-related information between image frames is obtained based on the feature matching relationship between the current frame and the similar key frame, features may be combined based on the same feature in each image frame, and the data-related information between image frames may be determined based on the combined features.

In operation S103, the method of estimating a pose of a device may include obtaining the pose of the device based on the data-related information.

Specifically, the method of estimating a pose of a device may include obtaining a more accurate pose result by obtaining the data-related information and then calculating the pose of the device based on the data-related information according to the bundle adjustment or the like.

Hereinafter, a detailed process of obtaining a similar key frame similar to the current frame collected by the device from the key frame set will be described with reference to FIGS. 2 and 3.

In an example embodiment, the obtaining of the similar key frame similar to the current frame collected by the device from the key frame set in operation S101 may include any one of the following operations A1 and A2.

Operation A1 includes extracting a global feature of the current frame, and obtaining a similar key frame similar to the current frame from a key frame set based on the global feature.

Specifically, image search may be performed in global extraction through global feature extraction of the current frame.

The key frame set may include a plurality of key frames. When performing operation A1, a similarity between the current frame and each key frame in the key frame set may be calculated through the global feature, and a key frame with a relatively high similarity may be used as a similar key frame similar to the current frame based on the calculated similarity.

Operation A2 includes extracting a global feature of the current frame and determining a first similarity between each key frame in the key frame set and the current frame based on the global feature; and extracting a local feature of the current frame and updating the first similarity based on the local feature to obtain a second similarity between each key frame in the key frame set and the current frame; and obtaining a similar key frame similar to the current frame based on the similar key frame.

In this case, the process of determining the first similarity between each key frame in the key frame set and the current frame based on the global feature may be understood as a process of performing an image search process in the key frame set, based on the global feature.

In addition, key frames may be ordered based on the first similarity.

In this case, the process of extracting the local feature of the current frame and updating the first similarity based on the local feature to obtain the second similarity between each key frame in the key frame set and the current frame may be understood as a process of performing geometric verification on the first similarity based on the local feature.

The geometric verification may be performed on the first similarity by extracting a local feature point attention score (or "a local feature point similarity score") of the current frame and further combining the local feature. Also, after the first similarity is updated based on a geometric verification result, the second similarity may be obtained.

In this case, the process of geometric verification includes the following process. That is, after extracting and obtaining local descriptors (i.e., local features) and the score of each local descriptor (which may be seen through a local feature point attention score map, a plurality of local descriptors with the highest score are selected, and the center of a corresponding perception field is calculated through the locations of the selected local descriptors on the current frame and used as the locations (key points) of feature points corresponding to the local descriptors. In extracting and obtaining the local descriptors, a first key point (i.e., a location of the most distinct feature on a first image frame) is detected from the first image frame, and pixel values around the first key point is normalized and computed as a first local descriptor for the first key point. Similarly, a second key point is detected from a second image frame, and pixel values around the second key point is normalized and computed as a second local descriptor for the second key point. The first local descriptor and the second local descriptor may be a vector of numbers that describes the visual appearance of the first key point and the second key point, respectively. The first key point and the second key point may be corners, edges, or any other distinct portions of objects captured in the first image frame and the second image frame, and the detection of the first key point and the second key point may be performed by Harris detector, a scale-invariant feature transform (SIFT) detector, and any other detector. The similarity between the current frame and the key frame is determined based on the locations, and the first similarity is updated.

In this case, when a similar key frame similar to the current frame is obtained based on the second similarity, a key frame with the highest similarity may be taken based on the second similarity and used as a similar key frame (also referred to as a common-view frame).

A descending similarity arrangement may be performed for each key frame based on the second similarity, and an N-frame key frame arranged in front may be used as the similarity key frame.

The global feature may represent an entire property of an image. In general, the perception field of the global feature may be a full frame image. The full frame image may be displayed as a single vector, have excellent invariance to light irradiation, changes in field of view, etc., and have a small amount of computations and a small storage space.

The local feature may be features extracted from an image local region. In general, the perception field of the local feature may be a local region of a full frame image. It is easy to be affected by light irradiation and changes in the field of view, but when the full frame image is described in a local feature, local verifiability may perform geometric verification with corresponding positions. In addition, often, the perception field of the local feature may have a relatively strong anti-interference ability and have a relatively good expression performance, but may have a large amount of computations and a large storage space.

Specifically, image search may be performed based on a global feature. For example, using the current frame as a given image, it is possible to search for an image frame with a relatively high similarity to the given image from each image frame (a key frame) included in a key frame set built in a SLAM system.

Based on this, geometric verification may be performed on similarity obtained during an image search process based on the local feature and the local feature point attention score map.

Therefore, based on a result of geometric verification, some key frames with relatively high similarity in the key frame set may be taken as similar key frames, and data-related information between the image frames may be determined based on a matching relationship between the given image (the current frame) and the similar key frame.

Hereinafter, a detailed process for obtaining data-related information between image frames based on a feature matching relationship between the current frame and the similar key frame will be described with reference to FIGS. 2 and 3.

In an example embodiment, operation S102 of obtaining data-related information between image frames based on the feature matching relationship between the current frame and the similar key frame may include the following operations B1 and B2.

Operation B1 includes performing inter-frame feature matching on a current frame to obtain first data-related information between image frames.

In this case, a method of performing inter-frame feature matching on the current frame may be implemented by referring to a method of tracking feature points of an input image in operation S101. For example, the method of tracking feature points may include a tracking method based on feature point matching between a current frame and a previous frame or a reference key frame, or an inter-frame tracking method based on optical flow method.

After performing inter-frame feature matching on the current frame, a feature matching relationship between the current frame and a key frame in the key frame set may be determined, and first data-related information between image frames may be obtained based on the feature matching relationship.

Figure 2:
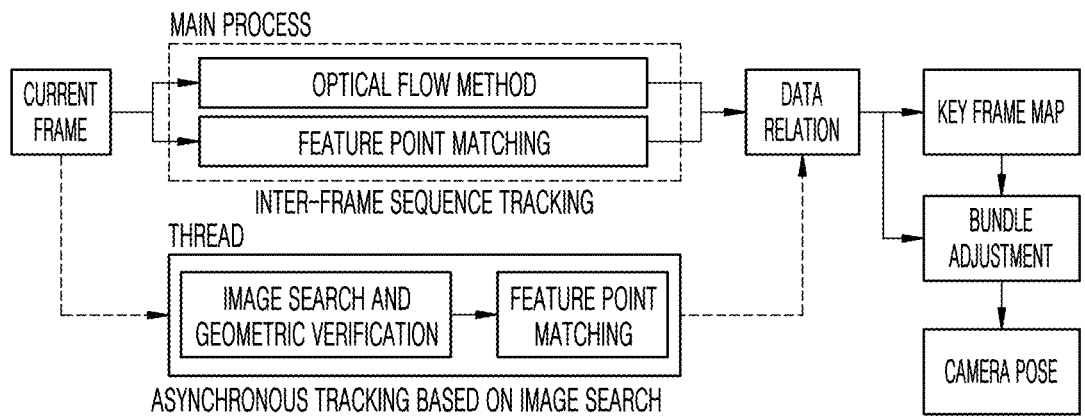
FIG. 2 is a system schematic diagram of pose estimation of a device based on image search and geometric verification, according to an example embodiment of the present disclosure.
Figure 3:
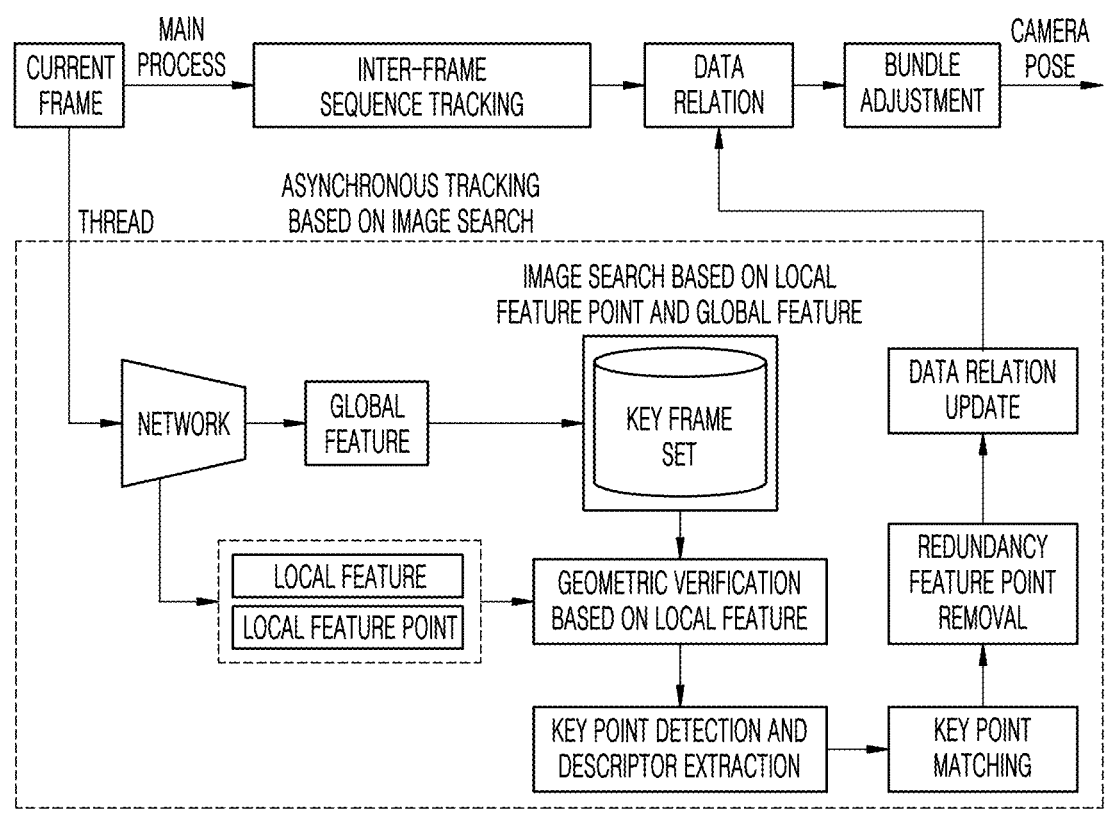
FIG. 3 is a flowchart of a pose estimation operation of a device, performed based on asynchronous tracking of image search, according to an example embodiment of the present disclosure.

Specifically, as shown in FIGS. 2 and 3, data relation between the current frame and all key frames in the key frame set may be built according to a feature point matching relation between a plurality of frames inputted recently.

Through the bundle adjustment, a camera pose corresponding to each frame and the 3D coordinates of feature points may be updated, and the device pose of the current frame may be output at the same time.

Operation B2 includes updating the first data-related information based on a feature matching relationship between the current frame and a similar key frame to obtain second data-related information between the image frames.

Specifically, as shown in FIGS. 2 and 3, in the process of executing operation B1, operation B2 may be executed through a thread. Through operation B2, an image search-based non-coherent tracking operation may be executed to determine a feature matching relationship between the current frame and the similar key frame. Furthermore, based on the feature matching relationship, the first data-related information obtained by executing inter-frame sequence tracking in a main process during operation B1 may be updated. The updated data-related information may mean second data-related information between the image frames.

In this case, a process of calculating the feature matching relationship includes the following operations. That is, feature points and descriptors on a similar key frame obtained by looking up a current frame may be extracted, and a three-dimensional (3D) point cloud corresponding to the current frame and the similar key frame may be obtained through a depth value corresponding to each key frame. Through the 3D point cloud, a corresponding device pose and a descriptor, a feature point matching relationship between two frames may be calculated.

In operation B2, an operation of updating the first data-related information based on the feature matching relationship between the current frame and the similar key frame and obtaining the second data-related information between the image frames may include the following operations C1 to C4.

Operation C1 includes performing inter-frame feature matching on the current frame to obtain first data-related information. The first data-related information may include a matching relationship between features of the image frames.

Operation C2 includes an operation of determining whether the features of each image frame are the same feature based on the feature matching relationship between the current frame and the similar key frame.

Specifically, based on a feature matching relationship between the current frame and each similar key frame, it may be determined whether features of two image frames are the same feature.

For example, when feature A on the current frame and feature B on the similar key frame are regarded as the same feature through a feature matching relationship between the two frames, feature A and feature B on all image frames may be regarded as the same feature.

Operation C3 includes combining the same features based on the determination result.

Specifically, if it is determined that one feature on the current frame and one feature on the similar key frame belong to the same feature, the stability and accuracy of image frame tracking may be improved by reducing the tracking operation for each distributed feature by combining the same features.

Specifically, the same features may be combined to generate a new feature, while the newly generated feature may contain all the information of the original non-identical features and further remove the original non-identical redundancy features. That is, the stability and accuracy of image frame tracking may be improved by combining the same features extracted and obtained from the current frame and the similar key frame and removing the non-identical features.

Operation C4 includes obtaining second data-related information by updating the first data-related information based on the combined features.

Specifically, the execution of operation C4 may include the following two cases.

Case 1 includes, as shown in FIG. 2, providing as feedback the combined features to a main process and updating the first data-related information obtained during the main process to obtain the second data-related information.

Case 2 includes, as shown in FIG. 3, obtaining the first data-related information prepared during the main process and completing the update of the first data-related information in a thread when obtaining the combined features. Furthermore, the second data-related information may be directly provided as feedback to the main process, and the pose of a device may be obtained based on the second data-related information directly from the main process.

In an example embodiment of the present disclosure, according to the obtained feature matching relationship, short-time tracking (or 'short-term tracking') corresponding to two matching features may be restored to one long-time tracking (or 'long-term tracking') (i.e., an operation to combine features in operation C3), and data relation may be tracked by returning to the main process.

The main process may update the data-related information. In this case, because the features of the short-time tracking (features that are not the same in the current frame and the similar key frame) are determined as the same features again and combined as the features of the long-term tracking, the features of the short-time tracking may be regarded as redundancy features and removed. Based on this, the main process may again calculate the pose of an image acquisition device according to the bundle adjustment and obtain a more accurate pose result.

In an example embodiment, as shown in FIGS. 2 and 3, the pose estimation method provided in the present disclosure may be applied to a SLAM system provided in the present disclosure. The SLAM system of the present disclosure may perform inter-frame sequence tracking on an image input in the main process, and may perform image search-based non-coherent tracking on an input image by adopting an image search model in a thread. The main process and the thread may be executed in parallel and/or simultaneously. In this case, the image search model may include an image feature extraction model provided in the following embodiment, and by processing an image input from the image feature extraction model, a global feature, a local feature, and a local feature point attention score map may be obtained. The introduction of threads enables the SLAM system to asynchronously perform looking up a similar key frame in a situation where the main process is not affected, thereby recovering the features of long-term tracking. Therefore, while improving the accuracy of the SLAM system, it is possible to reduce the number of optimization parameters and lower computational complexity by eliminating a short-time tracking function.

In an example embodiment, a similar key frame similar to the current frame may be obtained by adopting a network including an image feature extraction model.

In an example embodiment, in order to solve a problem in which a search technique performed only by relying on a global feature from among related image search techniques is fast but has low accuracy and geometric verification performed using a local feature has high accuracy but low speed, the present disclosure provides a global feature and local feature joint learning method (a learning method of an image feature extraction model). This allows both of them to improve in mutual learning and reach their current best performance in terms of speed and accuracy. An image feature extraction model obtained by learning based on the above method may be applied to a network of threads shown in FIG. 3.

In image feature extraction and image feature extraction model learning, mentioned among image search techniques, global feature learning may generally require only a data set composed by a single image, and local feature learning may require paired image blocks. Therefore, learning of a local feature may be difficult.

In order to make it possible to perform joint learning of a global feature and a local feature on a single network, it is necessary to solve problems of network structure selection and data generation.

In order to solve a problem in which a global feature learning input is different from a local feature learning input and a data set for building a local feature requires paired image blocks, the present disclosure provides a conjugate random rotation flip algorithm. According to the present disclosure, by performing a conjugate random rotation flip on an input image in a data set constituting only images, an input image required for global feature learning may be obtained and paired image blocks for local feature learning may also be constructed.

In addition, according to the present disclosure, a data set required for global feature learning and local feature learning may be built without the need for additional learning data.

Figure 5:
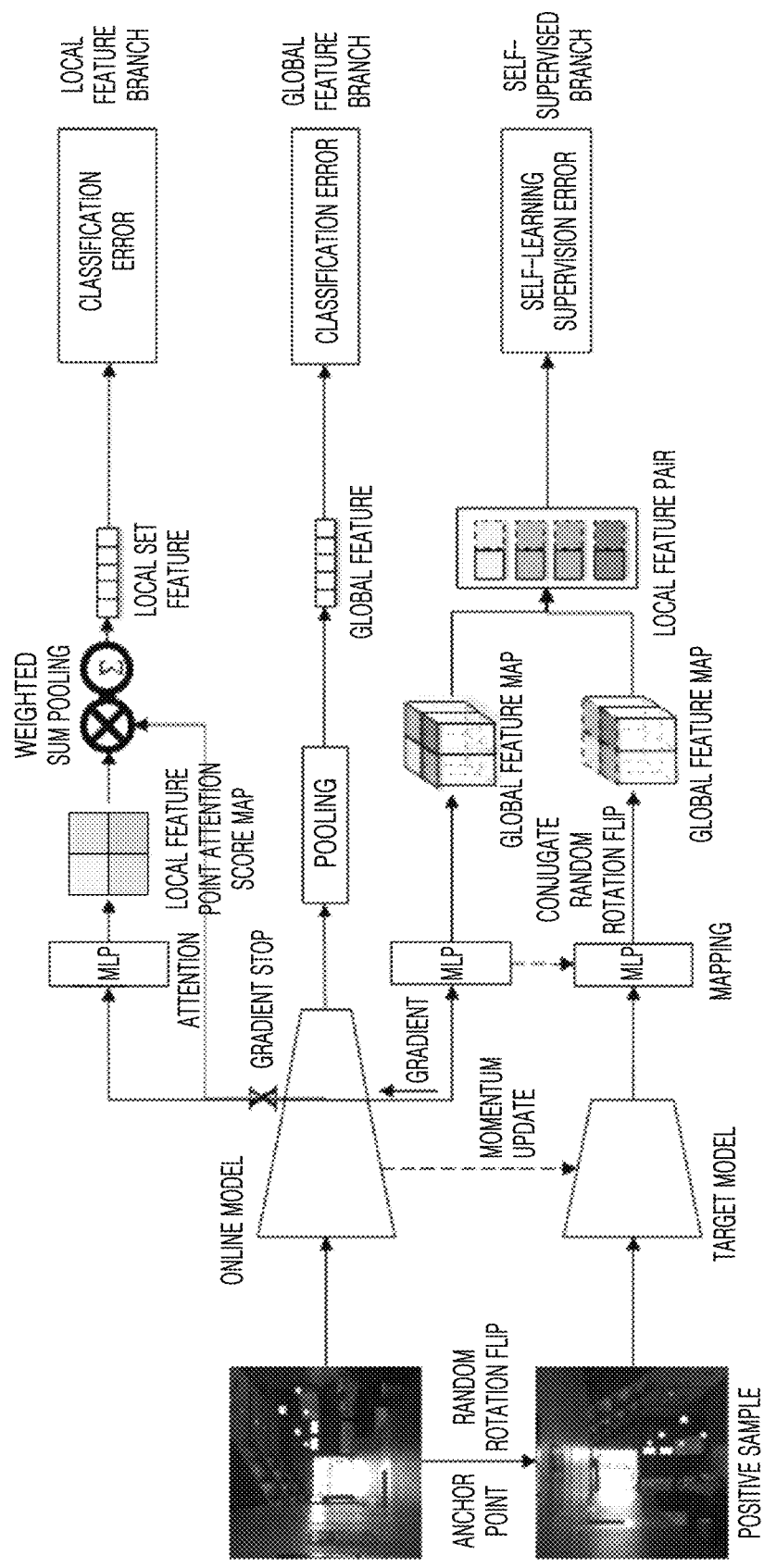
FIG. 5 is a frame schematic diagram of image feature extraction model learning optimized by the association of a global feature and a local feature, according to an example embodiment of the present disclosure.
Figure 6:
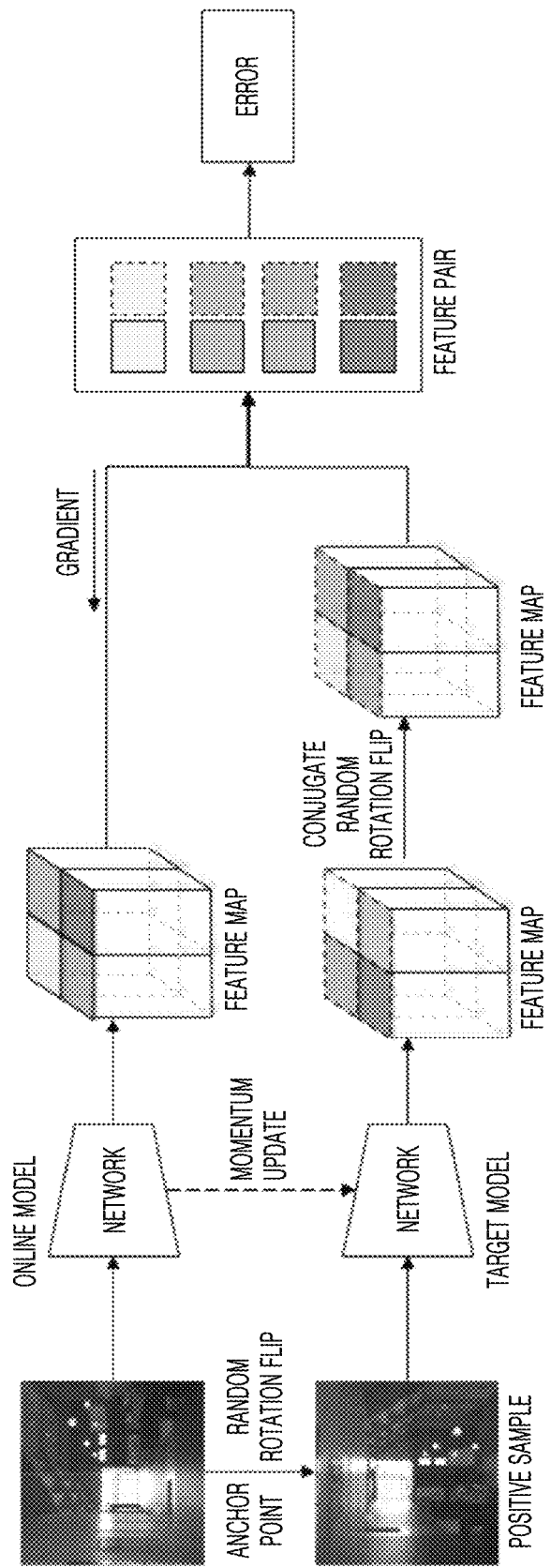
FIG. 6 is a schematic diagram of a local feature self-supervised learning network based on a conjugate random rotation flip, according to an example embodiment of the present disclosure.

In a learning method of an image feature extraction model provided in the following embodiments of the present disclosure, the image feature extraction model introduces a target model during learning, as shown in FIGS. 5 and 6. Hereinafter, before describing each operation of the learning method provided in the present disclosure, the architecture of the image feature extraction model (i.e., a deep network) will be described.

Specifically, as shown in FIG. 5, during learning, the image feature extraction model (also referred to as 'an online model' or 'an online convolutional neural network') may include three branches. The three branches include a local feature branch, a global feature branch, and a self-supervised branch (also referred to as 'a pixel-wised self-supervised learning branch'). The local feature branch may be used to process a first image (also referred to as 'an anchor point image') to obtain a global feature. The local feature branch may be used to process the first image to obtain a local feature point attention score map. The self-supervised branch may be combined with an introduced target model (also referred to as a target convolutional neural network) and used to perform learning of extracted local feature based on a local feature.

In the global feature branch, a generalized-mean pooling layer (GeM) and a whitening layer may be adopted to construct a backbone network of global feature learning.

The whitening layer is a fully connected layer with a learning bias. In an example embodiment of the present disclosure, a feature map may be used as an output of the backbone network. Based on this, for a given image and global feature g, the entire image may be summarized as in Equation 1 below.

$$g = F \times \left( \frac{1}{H_D \times W_D} \sum_{h,w} d_{h,w}^p \right)^{1/p} + b_F \quad \text{[Equation 1]}$$

In Equation 1, $d_{h,w} \in \mathcal{R}^{C_D}$ denotes the position (h, w) of one feature in a feature map D. p is a hyperparameter of the GeM pooling layer.

As shown in FIG. 5, in the local feature branch, the output of an intermediate layer may be used as an input of a residual network (ResNet) model. The purpose of this is to predict which of local features $L \in R^{C_L \times H_L \times W_L}$ extracted through an attention module is distinguished from the object of interest.

The attention module may predict the score of each feature on a local feature map L and output a local feature point attention score corresponding thereto.

After learning an image feature extraction model, in the reasoning process of image search, only a local feature with the highest attention score and a perception field center corresponding thereto may be selected and used as a key point location for geometric verification.

Thus, the attention module may be regarded as a coarse key point detector.

In the learning process, an attention score map A output by the attention module may be used to guide the update of a voice sample queue during a self-supervised learning branch. This will be described in detail in embodiments to be described below.

A global feature and a local feature may be integrated into one model through the self-supervised branch. The self-supervised branch may improve the performance of a local feature, and may improve the performance of a global feature by back-propagating a gradient to the backbone network.

As shown in FIG. 5, the self-supervised branch may be built with an online convolutional neural network and a target convolutional neural network. Two networks may share the same system structure and may have different networks.

The online convolutional neural network and the target convolutional neural network may each include an encoder and a projection head. The encoder may be composed of layers of a local feature branch of which the final output is a local feature L, and the projection head may be a multi-layer perceptron (MLP) composed of two fully connected layers.

The projection head may form embedded features $\varepsilon \in R^{C_E \times H_E \times W_E}$ by projecting local features $L \in R^{C_L \times H_L \times W_L}$ n a feature space onto an embedded space.

For an image I given in a self-supervised learning (or 'self-directed learning'), a data augmentation module may sample a look-up image $I_q$ (referred to as a first image or anchor point image) and a key image $I_k$ (referred to as a second image or positive sample) from the image I. The look-up image may be input to the online convolutional neural network (online model), and the key image may be input to the target convolutional neural network (target model). In this case, the embedded features $\varepsilon_k \in R_k^{C_E \times H_E \times W_E}$ represent the output of the online model, and the embedded features $\varepsilon_k \in R_k^{C_E \times H_E \times W_E}$ represents the output of the target model.

In the embodiment of the present disclosure, $e_{h,w}^q \in R_q^{C_E}$ and $e_{h,w}^k \in R_k^{C_E}$ may be used as embedded features of the position (h, w) in each feature map, and a positive sample local feature pair $P_{h,w} = <e_{h,w}^q, e_{h,w}^k>$ may be built and used for self-supervised learning.

Specifically, an example embodiment of the present disclosure proposes a new data augmentation method to implement the construction of an image pair (i.e., local feature pair) through conjugate random rotation flip algorithm.

In this case, as shown in FIG. 5, only the online model is updated through back-propagation in a learning process, and the target model is updated with the help of the online model through a momentum update method.

Formally, the parameter of an online model $f_q$ may be expressed as $\theta_q$, and the parameter of a target model $f_k$ may be expressed as $\theta_k$. The parameter $\theta_k$ may be updated through a relation equation $\theta_k = m\theta_k + (1-m)\theta_q$. In this case, a momentum coefficient is $m \in [0,1)$ and $m=0$ may indicate that the online model and the target model share the same parameter. However, only the gradient of a local feature $L_q$ may be back-propagated to the backbone network.

In an example embodiment of the present disclosure, an image feature extraction model is obtained by learning through the following method. The method may include the following operations D1 to D2.

Operation D1 includes obtaining a first image and a second image obtained by rotationally flipping the first image.

Specifically, the first image may be an image obtained after processing a learning image. Each image in a learning data set corresponding to the learning image may include an annotation at a corresponding image level.

In an example embodiment, the learning image is learning sample data for learning the image feature extraction model, and may include a plurality of images or a plurality of frame images.

In this case, a first image anchor may be an image obtained by performing a resizing process on each learning image. For example, the resizing process may be a process operation such as cropping and scaling.

The second image may be an image obtained by performing a rotational flip on each first image. The first image and the second image have a one-to-one correspondence relationship.

After the first image and the second image are obtained, data augmentation may be performed on the first image and the second image. The data augmentation may include random color luminance change, random gray scale change, random Gaussian blur, and the like.

Hereinafter, a detailed process of obtaining the first image based on the learning image will be described.

In an example embodiment, the obtaining of the first image in operation D1 may include the following operations D11 to D13.

Operation D11 includes obtaining a learning image.

Specifically, the learning image may be image data obtained based on an image feature extraction model application scene. For example, when applied to a current cleaning robot, the learning image may be various furniture images.

Operation D12 includes obtaining a crop image by randomly cropping the learning image.

Specifically, by considering the fact that the size of the learning image obtained in operation D11 is not uniform, random cropping may be performed on the learning image. For example, cropping may be performed randomly according to the size of 400×300 or 224×224.

Operation D13 includes obtaining a first image of the learning image by rearranging the crop image based on a certain image size.

Specifically, the rearrangement may be understood as performing scaling processing on the crop image. For example, enlarging or reducing processing is performed on crop images having different sizes, according to a certain image size. The ratio for the enlarging or reducing processing may be an equal ratio or a compressed ratio.

Hereinafter, a detailed process of obtaining the second image by performing rotational flip processing based on the first image will be described in detail with reference to FIG. 8.

In an example embodiment, the obtaining of the second image by performing rotational flip processing on the first image in operation D1 may include any one of operations D111 to D112 below.

Operation D111 includes rotating the first image to obtain a corresponding second image rotated at a random angle.

Figure 8:
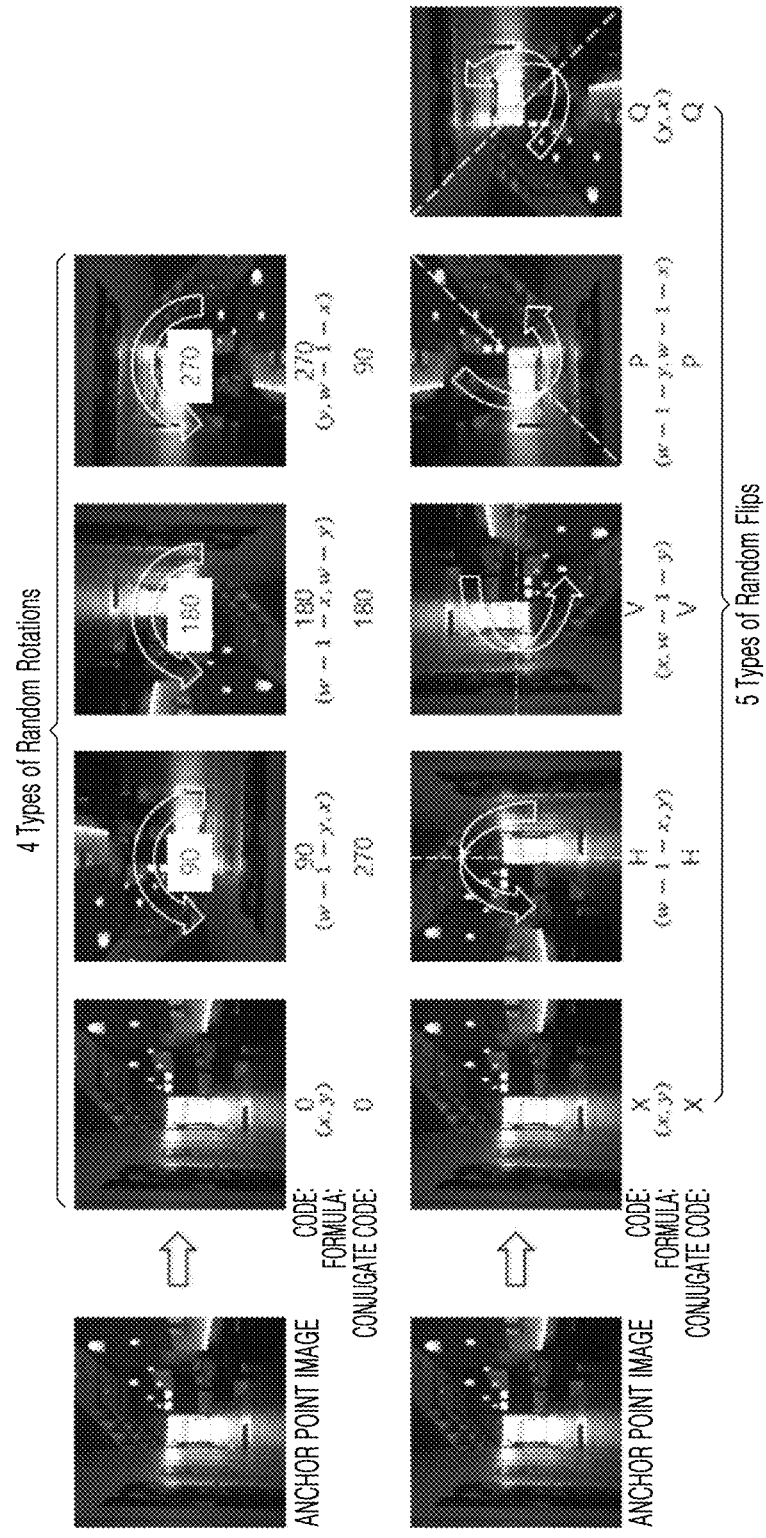
FIG. 8 is a principle diagram of a random rotation flip.

Specifically, as shown in FIG. 8, random rotation may be used to rotate an image or a feature map around a center.

Depending on a rotating clockwise rotation angle, there are four different rotation angles, which may be 0°, 90°, 180°, and 270°.

Various types all have one corresponding code 0, 90, 180, and/or 270. Each code has one conjugate code 0, 270, 180, and/or 90.

In this case, a conversion formula corresponding to the various types may be (x, y), (w−1−y, x), (w−1−x, w−y), and (y, w−1−x). w represents a rotation angle, x represents the horizontal position of a feature point in an image, and y represents the vertical position of the feature point in the image.

When a square matrix M is provided, a rotation operation may convert the square matrix M into M', and a conjugate rotation operation may convert M' into the original square matrix M.

Operation D112 includes flipping the first image to obtain a corresponding second image flipped along a random axis.

Specifically, as shown in FIG. 8, a random flip may be used to flip an image or a feature map depending on a flip direction.

There may be 5 different flips depending on the flip direction. For example, there may be a none flip, a horizontal flip, a vertical flip, a major diagonal flip, and a minor diagonal flip.

Various types all have one corresponding code X, H, V, P, and/or Q.

Each code has one conjugate code X, H, V, P, and/or Q.

In this case, a conversion formula corresponding to the various types may be (x, y), (w−1−x, y), (x, w−1−y), (w−1−y, w−1−x), and (y, x). w denotes a flip angle, x denotes the horizontal position of a feature point in an image, and y denotes the vertical position of the feature point in the image.

When a square matrix M is provided, a flip operation may convert the square matrix M into M', and a conjugate flip operation may convert M' into the original square matrix M.

In an example embodiment, in a random combination from a random rotation and a random flip, a total of 12 random rotation flip algorithms may be obtained.

That is, the present disclosure is not limited to performing only a random rotation or a random flip on the first image, but a random rotation and a random flip may be performed on the first image.

In an example embodiment of the present disclosure, a random rotation flip (including at least one of a random rotation and a random flip) may be performed on the first image to obtain a second image, which may improve diversity of learning samples and improve the performance of model learning feature representation.

Operation D2 includes obtaining a learned image feature extraction model by performing joint learning on an image feature extraction model through a global feature and a local feature extracted from the image feature extraction model, based on the first image and the second image.

Specifically, a single image feature extraction model is adopted to perform joint learning of a global feature and a local feature. The learned image feature extraction model may simultaneously extract a global feature and a local feature. The implementation of joint learning helps a mutual learning process, and may improve the expression ability of global and local features.

In an example embodiment of the present disclosure, a method of integrating global feature learning and local feature learning through self-supervised learning is provided, and the method may be referred to as a Unify Local Feature and Global Feature for Image Retrieval via Pixel-wised Self-Supervised Learning (PULG) method.

The extraction of global and local features may be learned from a single model, and mutual learning may be performed.

The PULG method proposed in the present disclosure may use self-supervised learning as an auxiliary task on a local feature. This aims to improve the representation of a local feature, and by back-propagating a gradient to the backbone network, the benefit of a global feature may be finally obtained from learning a local feature.

In an example embodiment, it may be understood that operation D2 includes obtaining a learned image feature extraction model by performing joint learning on an image feature extraction model through a global feature and a local feature extracted from the image feature extraction model, based on the first image and the second image.

Specifically, as shown in FIGS. 5 and 6, the image feature extraction model (also referred to as an online model) performs learning by further combining a target model introduced during learning therewith. The first image may be an input of the online model, and the second image may be an input of the target model. That is, the first image and the second image corresponding one-to-one in learning sample data to which the image feature extraction model is input are used as input for each round of learning.

Figure 7:
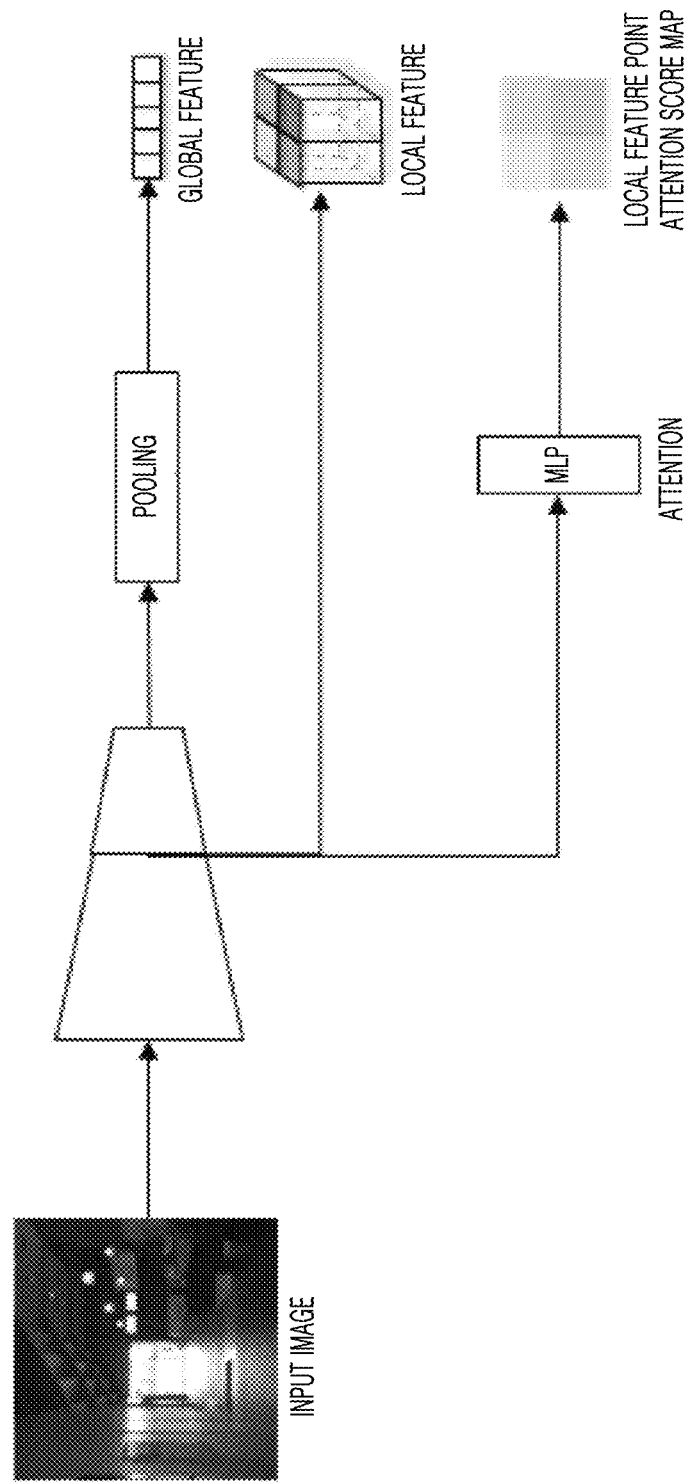
FIG. 7 is an inference schematic diagram of image feature extraction model learning optimized by the association of a global feature and a local feature, according to an example embodiment of the present disclosure.

Specifically, as shown in FIG. 7, the learned image feature extraction model does not require target model matching processing. That is, after an image is input, the global feature, local feature, and local feature point attention score may be extracted and obtained through the online model.

Specifically, performing joint learning on the image feature extraction model through the global and local features extracted from the image feature extraction model in operation D2 may include the following operations E1 to E4.

Operation E1 includes obtaining a local feature and a global feature of the first image through the image feature extraction model.

Specifically, an online convolutional neural network (online CNN) corresponds to the image feature extraction model, and may span a global feature branch, a local feature branch, and a self-supervised branch in a learning process (shown in FIG. 5).

In the case of the global feature branch, the first image may be subjected to online convolutional neural network processing to obtain a global feature.

In the case of the local feature branch, the first image may be subjected to online convolutional neural network processing to obtain a local feature map of the first image, and then a local feature point attention score map may be generated through an attention model composed of a multilayer perceptron, and local set features may be obtained by performing a weighted sum pooling process on a local feature point score map and a local feature map of the first image (the above process is applicable to calculation of a loss function).

In the case of the self-supervised branch, a local feature map of the first image may be obtained through online convolutional neural network processing on the first image. A multilayer perceptron may be further built in the self-supervised branch, and the local feature map of the first image may be mapped through the multilayer perceptron to obtain its embedded features.

Operation E2 includes obtaining a local feature of the second image through the target model, and performing a conjugate rotation flip corresponding to a rotation flip on the local feature of the second image.

Specifically, a target convolutional neural network (target CNN) may have a partial network structure introduced to help the learning of the image feature extraction model in a learning process. This may be applied to a self-supervised branch in the learning process (shown in FIG. 5).

In the case of the self-supervised branch, a local feature map of the second image may be obtained after target CNN processing is performed on the second image. A multilayered perceptron may be further built in the self-supervised branch. The local feature map of the second image may be mapped through a multilayer perceptron to obtain its embedded features (a local feature map of the second image).

Specifically, corresponding to the processing of obtaining the second image after the first image is rotationally flipped in operation D1, in operation E2, conjugate rotation flip processing may be performed on the local feature of the second image, and thus, a conjugate rotation flip-processed local feature of the second image may be obtained.

In this case, the conjugate rotation flip processing is non-random processing. Specifically, conjugation processing may be performed according to a method adopted for the random rotation flip in operation D1. For example, when the random rotation flip corresponds to a rotation, a conjugate rotation may be performed on the local feature of the second image.

Hereinafter, a detailed process of obtaining a conjugate rotation flip-processed local feature of the second image by performing the conjugate rotation flip processing based on the local feature of the second image will be described with reference to FIG. 8.

In an example embodiment, in operation E2, performing the conjugate rotation flip corresponding to a rotation flip on the local feature of the second image may include obtaining a second local feature corresponding one-to-one to the local feature of the first image by performing a conjugate rotation flip on the local feature of the second image based on rotation flip processing on the first image.

Specifically, in the case of a random rotation flip operation performed on the first image in operation D1, in the present embodiment, a corresponding conjugate random rotation flip is performed on the local feature of the second image (it may be understood as executing on a feature map where the local feature of the second image is located).

For example, a random rotation flip may convert image A into image B, and a corresponding conjugate random rotation flip may convert image B back to image A.

The operation of operations D1 and E2 may secure a pixel-to-pixel correspondence between a local feature map (a feature map in which the local feature of the first image are located, and also referred to as an anchor point local feature map) including lookup features and a local feature map (a feature map in which the local feature of the second image are located, and also referred to a positive sample local feature map) including key value features.

Also, through one-time cropping, a positive sample local image pair and a positive sample local feature pair, which have sufficient diversity, may be obtained.

Diversity between pairs of positive samples may ensure that a network produces sufficiently large differences in a learning process. The differences may supervise the network by using a comparative error loss function in an example embodiment of the present disclosure, allowing a backbone network to learn better performance.

Operation E3 includes obtaining a local feature pair based on the local feature of the first image and the conjugate rotation-flipped local feature of the second image.

Specifically, as shown in FIG. 5, a local feature pair may be configured based on a one-to-one correspondence between the local feature of the first image and the local feature of the second image. The local feature pair may be applied to a learning process of a local feature in an image feature extraction model.

That is, in an example embodiment of the present disclosure, a target convolutional neural network may be introduced to extract the local feature of the second image and the local feature of the first image may be combined with the local feature of the second image, and thus, learning sample data (a local feature pair) for learning and extracting a local feature may be obtained and the cost of additionally obtaining learning sample data for local feature extraction learning may be reduced.

Calculation of a loss function may be performed based on the local feature pair to update a network parameter of the image feature extraction model.

In an example embodiment, a self-supervised branch may perform mapping by employing a multilayer perceptron on a local feature map of the first image output by an online model and a local feature map of the second image output by a target model, and may obtain corresponding embedded features (which may be implemented as a local feature). Also, the self-supervised branch may obtain a one-to-one corresponding local feature pair based on a correspondence relationship between the local feature map of the first image and the local feature map of the second image.

Operation E4 includes updating the parameters of the image feature extraction model based on the local feature pair and the global feature.

Specifically, as shown in FIG. 5, a global feature branch performs calculation of an error function based on the global feature. A local feature branch may perform calculation of an error function based on a local feature point attention score map. The self-supervised branch performs calculation of an error function based on a local feature pair (specifically, a local feature pair obtained by combining the local features of the first image with the local features of the second image). Furthermore, based on three errors, a backhaul may be performed and a network model (an online model and a target model) may be optimized. In this case, a gradient of the local feature branch is not backhauled to a backbone network.

The conjugate random rotation flip algorithm presented in the present disclosure is applied to the local feature of the first image and the second image to generate a local feature pair, and because a local feature pair may be generated using one input image, there is no need to additionally obtain local feature pair data required for local feature learning.

Specifically, through the presented conjugate random rotation flip algorithm, on a dataset with only image-level annotations, a global feature and local image pair required for global feature and local feature joint learning are simultaneously provided. In addition, the global feature and local feature joint learning may be implemented on the dataset with only image-level annotations.

As may be seen from FIGS. 5 and 7, the PLUG model presented in an example embodiment of the present disclosure may be a multitask model based on a convolutional neural network. In a learning process of a model, the model may be composed of three branches, that is, a global feature branch, a local feature branch, and a self-supervised learning branch. In an inference process of the model, only a global feature branch and a local feature branch may be adopted.

In a learning process of the model, the introduction of a self-supervised learning branch helps to improve the representation performance of global and local feature.

Hereinafter, a detailed process of updating a network parameter of an image feature extraction model based on a global feature and a local feature pair will be described in detail.

In an example embodiment, the updating of the network parameter of the image feature extraction model based on the global feature and the local feature pair in operation E4 may include the following operations E41 to E44.

Operation E41 includes determining a first loss value through a cross-entropy loss function on a classification task based on the global feature.

Specifically, each obtained learning image carries a real class label. In an example embodiment of the present disclosure, a predicted class label corresponding to a learning image may be estimated on a classification task through a global feature, and a first loss value may be determined through a cross-entropy loss function based on an actual class label and the predicted class label.

Specifically, the global feature may perform supervised learning through the cross-entropy loss function on the classification task through an ArcFace error function after normalization, and may calculate the first loss value by adopting the cross-entropy loss function, which may be expressed by Equation 2 below.

$$L_g(\hat{g}, y) = -\log\left(\frac{e^{AF(\hat{g}, y_k)}}{e^{AF(\hat{g}, y_k)} + \sum e^{AF(\hat{g}, y_n)}}\right) \quad \text{[Equation 2]}$$

In this case, $\hat{g}$ is a result after normalizing a global feature g. y is a one-hot vector (1-bit valid code). $y_k$ indicates that the global feature g belongs to class k of an image classification task, and only $y_k=1$.

Operation E2 includes determining a second loss value through a cross-entropy loss function on a classification task based on a local feature point attention score map.

Specifically, in a local feature branch, an attention module may be learned by adopting the same classification task as in a global feature branch.

The determining of the second loss value through the cross-entropy loss function on the classification task based on the local feature point attention score map in operation E42 may include the following operations E421 to E422.

Operation E421 includes obtaining a local set feature by obtaining a weighted sum based on a local feature of a first image and a local feature point attention score map.

Specifically, after a local feature map of the first image is normalized, an attention score map of a local feature point and a weighted sum are obtained, which may be expressed by Equation 3 below.

$$\hat{L}'_g = \sum_{h,w} \hat{L}_{h,w} \times \mathcal{A}_{h,w}. \quad \text{[Equation 3]}$$

In this case, $\hat{L}$ is a local feature map of the first image after normalization, and A is an attention score map of the local feature point.

Operation E22 includes determining a second loss value through a cross-entropy loss function on a classification task based on a local set feature.

Specifically, in the classification task, supervised learning may be performed through a fully connected layer (a convolutional layer w and a bias b) and a cross-entropy loss function, and the loss of a local feature branch may be expressed as the cross-entropy loss of a standard softmax activation function. This is expressed as Equation (4).

$$L_l(\hat{L}'_g, y) = -\log\left(\frac{e^{w_k \hat{L}'_g + b_k}}{e^{w_k \hat{L}'_g + b_k} + \sum_n e^{w_n \hat{L}'_g + b_n}}\right) \quad \text{[Equation 4]}$$

In this case, $w_i$ denotes a classifier weight of class i, $b_i$ denotes a bias of class i, y is a one-hot vector (1-bit valid code), and k is one of classification task actual classes (groundtruth) ($y_k=1$).

Operation E43 includes determining a third loss value through a cross-entropy loss function based on a local feature pair.

Specifically, a self-supervised branch may be learned by adopting a nonparametric classifier (e.g., a classifier used in datasets InstDest, MoCo and Mo—CoV2), and a classifier may be constructed by substituting a fully connected layer through cosine scores of a positive sample local feature pair (a local feature pair obtained in operation E3) and a negative sample local feature pair.

The determining of the third loss value through the cross-entropy loss function based on the local feature pair in operation E43 may include the following operations E431.

Operation E431 includes determining the third loss value through the cross-entropy loss function based on the local feature pair and a negative sample local feature. In this case, the local feature pair includes an anchor point local feature on a local feature map of the first image and a positive sample local feature on a second positive sample local feature map. The negative sample local feature includes a positive sample local feature corresponding to a maximum value of a local feature point attention score in a previous round of model learning.

Specifically, a loss function of the self-supervised learning branch may be expressed by Equation (5).

$$L_{psst} = -\log\left(\frac{e^{e^{\hat{q}}\hat{e^{k}}/\tau}}{e^{e^{\hat{q}}\hat{e^{k}}/\tau} + \sum e^{e^{\hat{q}}\hat{e^{n}}/\tau}}\right) \quad \text{[Equation 5]}$$

In this case, τ denotes a temperature hyperparameter, and $e^{\hat{q}}$, $e^{\hat{k}}$, and $e^{\hat{n}}$ denote embedded features of a local feature $e^q$ (also referred to as an anchor point local feature) of a first image in a negative sample queue, a local feature $e^k$ (also referred to as a positive sample local feature) of a second image in the negative sample queue, and a negative sample local feature $e^n$, respectively.

In this case, the negative sample local feature may be derived from the previous round of learning process, and a maximum value of a local feature point attention score map A of the first image and a local feature of the second image corresponding thereto may be obtained, and transferred to the negative sample queue, and used as a negative sample $e^n$ for a next round of learning process. In this case, the length of the negative sample queue have a fixed value, and a queue may be updated according to a first-in-first-out method.

Operation E44 includes updating a network parameter of the image feature extraction model based on a first loss value, a second loss value, and a third loss value.

Specifically, a global feature loss function $L_g$, a local feature point attention loss function $L_l$ and a local feature self-supervised loss function $P_{pssl}$ are calculated through weighted summation to obtain a total loss value L, which is then used for network learning. In this case, a weighting factor is β=1, γ=0.1, and the total loss value L is expressed by Equation 6 below.

$$L = L_g + \beta L_l + \gamma L_{pssl} \quad \text{[Equation 6]}$$

Hereinafter, a detailed process of updating the network parameter of the image feature extraction model will be described.

In an example embodiment, the updating of the network parameter of the image feature extraction model based on the first loss value, the second loss value, and the third loss value in operation E44 may include the following operations E441 to E442.

Operation E441 includes updating a network parameter of an online convolutional neural network based on the first loss value, the second loss value, and the third loss value.

Operation E442 includes updating a network parameter of a target convolutional neural network based on the network parameter of the online convolutional neural network.

When updating network parameters, only an online model may be updated through gradient backpropagation based on the first loss value, the second loss value, and the third loss value during a learning process, and a target model may be updated with the help of the online model through a momentum update method.

Formally, a parameter of an online model $f_q$ is expressed as $\theta_q$, and a parameter of a target model $f_k$ is expressed as $\theta_k$. The parameter $\theta_k$ may be updated through a relationship $\theta_k = m\theta_k + (1-m)\theta_q$. In this case, a momentum coefficient is m∈[0,1), and m=0 indicates that the online model and the target model share the same parameter. However, only the gradient of a local feature $L_q$ is backpropagated to a backbone network, and the gradient of a local set feature is not backhauled to the backbone network.

The target model may directly adopt the online model, where the target model and the online model may form a siamese network and may be updated in a learning process at the same time.

In an example embodiment, the processing of an input image in an image feature extraction model shown in FIG. 7 may output a global feature and a local feature. A result of feature extraction may be applied to a SLAM system, and may also be applied to image search or image recognition technology.

Specifically, in one aspect of an example embodiment of the present disclosure, with respect to images obtained from a device, inter-frame matching may be calculated through an optical flow method or feature point matching algorithm, data relation may be established, and a camera pose may be calculated through local bundle adjustment and global bundle adjustment, and thus, simultaneous localization and mapping of the SLAM system may be implemented. In another aspect, through a global feature and local feature joint learning model presented in an example embodiment of the present disclosure, the expression abilities of a global feature and a local feature may be simultaneously improved depending on a conjugate random rotation flip algorithm, and an image search model may learn the global feature and the local feature simultaneously without depending on additionally paired image blocks on data set in which there are only images. Ultimately, the global feature and local feature joint learning model presented in an example embodiment of the present disclosure shows better results than global and local feature-based geometric verification among related technologies, and may reduce time complexity requirements and improve pose estimation accuracy.

An example embodiments of the present disclosure may provide an accurate image search and geometric verification-based SLAM system. In the case of an image captured and obtained by an image collection device, after tracking through an existing feature point matching method or an optical flow method, the pose of the device may be calculated through bundle adjustment. In addition, a deep learning model may help the SLAM system build long-term tracking. That is, a key frame with a relatively high similarity may be selected in a key frame set composed of key frames selected by the SLAM system with respect to a current input image captured and obtained by the device, and a feature point matching relationship between the current input image and a key frame obtained by lookup, and thus, long-term tracking may be built.

An example embodiment of the present disclosure may optimize a global feature and a local feature at the same time by fusion with related technologies, in a situation where a local image block pair is not additionally generated, through a conjugate random rotation flip algorithm by using a deep learning model of global feature and local feature association learning. Ultimately, an image deep feature extraction method of global feature and local feature association optimization may improve the expression ability of a deep feature and help the SLAM system to find more accurate similar images, and thus, long-term tracking of a feature point may be built and the SLAM system may remove a redundancy feature point (a feature point corresponding to short-time tracking). The building of long-term tracking of a feature point may help to improve the optimization speed and accuracy of the SLAM system.

Figure 9:
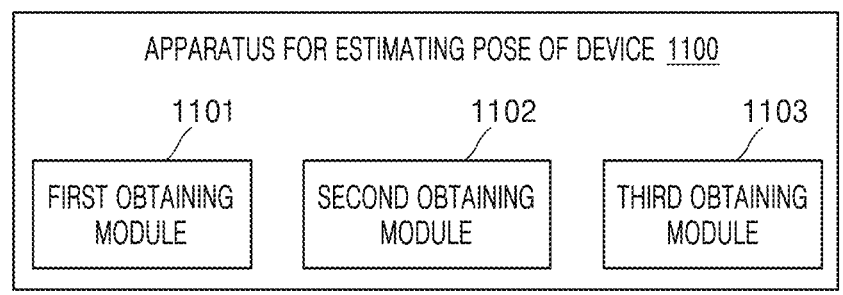
FIG. 9 is a structural diagram of an apparatus for estimating a pose of a device, according to an example embodiment of the present disclosure.

Corresponding to the method of estimating a pose of a device, provided in the present disclosure, an example embodiment of the present disclosure provides an apparatus 1100 for estimating a pose of a device. The structure of the apparatus 1100 is as shown in FIG. 9. The apparatus 1100 for estimating a pose of a device, according to an example embodiment of the present disclosure, may include a first obtaining module 1101, a second obtaining module 1102, and a third obtaining module 1103. The first obtaining module 1101 may be configured to obtain a similar key frame similar to a current frame collected by the device from a key frame set. The second obtaining module 1102 may be configured to obtain data-related information between image frames based on a feature matching relationship between the current frame and the similar key frame. The third obtaining module 1103 may be configured to obtain the pose of the device based on the data-related information.

In an example embodiment, when the first obtaining module 1101 executes obtaining the similar key frame similar to the current frame collected by the device from the key frame set, the first obtaining module 1101 may further execute one of: (1) extracting a global feature of the current frame and obtaining a similar key frame similar to the current frame from the key frame set based on the global feature; and (2) extracting a global feature of the current frame, determining a first degree of similarity between each key frame in the key frame set and the current frame based on the global feature, extracting a local feature of the current frame, updating the first degree of similarity based on the local feature to obtain a second degree of similarity between each key frame in the key frame set and the current frame, and obtaining a similar key frame similar to the current frame based on the similar key frame.

In an example embodiment, when the second obtaining module 1102 executes obtaining data-related information between image frames based on a feature matching relationship between the current frame and the similar key frame, the second obtaining module 1102 may further execute: performing inter-frame feature matching on the current frame to obtain first data-related information between the image frames; and updating the first data-related information based on the feature matching relationship between the current frame and the similar key frame to obtain second data-related information between the image frames.

In an example embodiment, when the second obtaining module 1102 executes updating the first data-related information based on the feature matching relationship between the current frame and the similar key frame to obtain the second data-related information between the image frames, the second obtaining module 1102 may execute: performing inter-frame feature matching on the current frame to obtain the first data-related information, wherein the first data-related information includes a matching relationship between features of the image frames; determining whether the features of the image frames are the same based on the feature matching relationship between the current frame and the similar key frame; combining the same features based on the determination result; and obtaining the second data-related information by updating the first data-related information based on the combined features.

In an example embodiment, by adopting an image feature extraction model in the first obtaining module 1101, the similar key frame similar to the current frame collected by the device may be further obtained from the key frame set.

Specifically, with respect to the image feature extraction model, a learned image feature extraction model may be obtained by performing: obtaining a first image and a second image obtained by rotationally flipping the first image; and based on the first image and the second image, performing joint learning on the image feature extraction model through a global feature and a local feature extracted by the image feature extraction model.

In an example embodiment, the performing of the joint learning on the image feature extraction model through a global feature and a local feature extracted by the image feature extraction model may include: obtaining a local feature and a global feature of the first image through the image feature extraction model; obtaining a local feature of the second image through a target model and performing a conjugate rotation flip corresponding to a rotation flip on the local feature of the second image; obtaining a local feature pair based on the local feature of the first image and the conjugate rotation-flipped local feature of the second image; and updating parameters of the image feature extraction model based on the local feature pair and the global feature.

The apparatus according to an example embodiment of the present disclosure may execute the method provided in an example embodiment of the present disclosure. The implementation principle of the apparatus is similar to that of the method, and an operation performed by each module in the apparatus according to an example embodiment of the present disclosure corresponds to an operation in the method according to each embodiment of the present disclosure. Detailed functional description of each module in the apparatus may refer to the description in the corresponding method described above in detail, and thus will not be described further herein.

The present disclosure further provides an electronic device. The electronic device includes a memory and a processor. In this case, a computer program is stored in the memory. The processor is used to execute the method of estimating a pose of a device, provided in any one optional embodiment of the present disclosure, when the computer program is run.

The present disclosure further provides a computer-readable storage medium. A computer program is stored in the storage medium. When the computer program is run by the processor, the method of estimating a pose of a device, provided in any one optional embodiment of the present disclosure, is executed.

Figure 10:
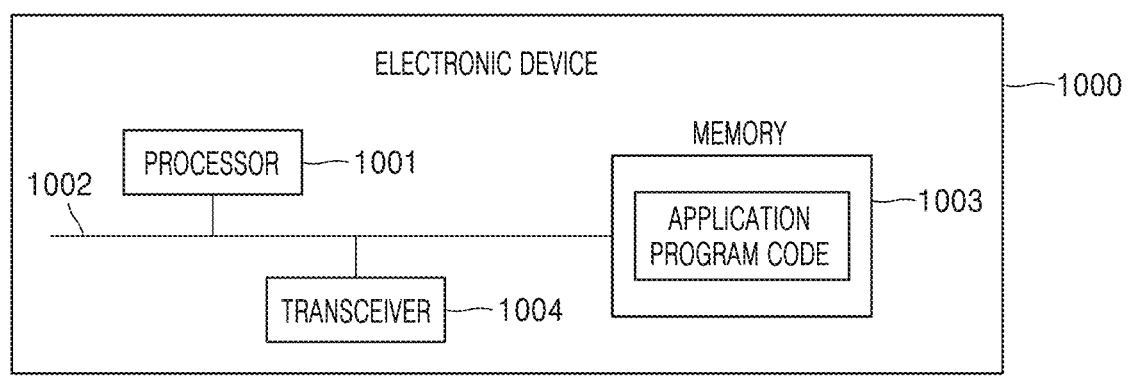
FIG. 10 is a structural diagram of an electronic device according to an example embodiment of the present disclosure.

As an option, FIG. 10 shows a structural diagram of an electronic device 1000 applied to an example embodiment of the present disclosure. As shown in FIG. 10, the electronic device 1000 includes a processor 1001 and a memory 1003.

The processor 1001 and the memory 1003 are connected to each other. For example, the processor 1001 and the memory 1003 may be connected to each other via a bus 1002.

The electronic device 1000 may further include a transceiver 1004.

In practical applications, the transceiver 1004 is not limited to one. The structure of the electronic device 1000 is not limited to the embodiment of the present disclosure.

The processor 1001 may include a central processing unit (CPU), a general-purpose processor, a digital signal processor (DSP), an application specific integrated circuit (ASIC), a field-programmable gate array (FPGA), a programmable logic device, a transistor logic device, a hardware member, or any other combination.

The processor 1001 may implement various illustrative logical blocks, modules, and circuits described in the present disclosure or execute the functions thereof.

The processor 1001 may be a combination that implements a computing function. For example, the processor 1001 may include a combination of one or more microprocessors, a combination of a DSP and a microprocessor, and the like.

The bus 1002 may include a path for information transfer between the aforementioned components.

The bus 1002 may be a peripheral component interconnect (PCI) bus or an extended industry standard architecture (EISA) bus, or the like.

The bus 1002 may be divided into an address bus, a data bus, a control bus, and the like.

In FIG. 10, only one thick line is used for convenience of expression, but this does not mean that there is only one bus or one type of bus.

The memory 1003 may include read only memory (ROM) or other type of static storage device capable of storing static information and instructions, or random access memory (RAM) or other type of dynamic storage device capable of storing information and instructions. In addition, the memory 1003 may include electrically erasable programmable read only memory (EEPROM), compact disc read only memory (CD-ROM) or other compact disc storage, optical disc storage (including compressed optical disc, laser disc, optical disc, digital universal optical disc, Blu-ray optical disc, or the like), magnetic disk storage medium or another magnetic storage device, or any other medium capable of carrying or storing desired program code in the form of instructions or data structures and accessible by a computer, but is not limited thereto.

The memory 1003 may be used to store application program code for executing the method of the present disclosure, and execution may be controlled by the processor 1001.

The processor 1001 may be used to execute the application program code (a computer program) stored in the memory 1003 to implement contents shown in any one of the above-described method embodiments.

In embodiments provided in the present disclosure, the method of estimating a pose of a device, executed in an electronic device may be performed using an AI model.

According to an example embodiment of the present disclosure, the method executed in the electronic device may use image data or video data as input data of the AI model to obtain output data for recognizing an image or an image feature in an image.

The AI model may be obtained through learning.

In this case, "obtaining through learning" means obtaining a predefined operation rule or AI model configured to execute an expected feature (or purpose) by learning a basic AI model by using a plurality of learning data through a learning algorithm.

The AI module may include a plurality of neural network layers.

In the plurality of neural network layers, each layer may include a plurality of weights, and may perform a neural network calculation through a calculation between a calculation result of a previous layer and the plurality of weights.

Visual understanding is a technique for recognizing and processing objects, such as human vision, and may include, for example, object recognition, object tracking, image search, human recognition, scene recognition, 3D reconstruction/localization, or image augmentation.

The apparatus for estimating a pose of a device, provided in the present disclosure, may implement at least one module among a plurality of modules through an AI model.

Functions related to AI may be performed through non-volatile memory, volatile memory, and a processor.

The processor may include one or more processors.

In this case, the one or more processors may include a general-purpose processor (e.g., a central processing unit (CPU), an application processor (AP), etc.), a pure graphics processing unit (e.g., a graphics processing unit (GPU)), a visual processing unit (VPU), and/or an AI dedicated processor (e.g., a neural processing unit (NPU)).

The one or more processors may control processing of input data according to a predefined operation rule or AI model stored in non-volatile memory and volatile memory.

The one or more processors may also provide a predefined operation rule or AI model through training or learning.

In this case, provision by learning means obtaining an AI model having a predefined operation rule or desired characteristics by applying a learning algorithm to a plurality of learning data.

The learning may be performed in a device itself executing AI according to an example embodiment, and/or may be implemented by a separate server/system.

The AI model may be configured to include a plurality of neural network layers. Each layer has a plurality of weights, and the calculation of one layer is performed using a calculation result of a previous layer and a plurality of weights of a current layer.

Examples of neural networks include convolutional neural network (CNN), deep neural network (DNN), recurrent neural network (RNN), restricted boltzmann machine (RBM), deep belief network (DBN), bidirectional recurrent deep neural network (BRDNN), generative adversarial network (GAN), and deep Q network.

The learning algorithm is a method of making, allowing, or controlling a certain target device (e.g., a robot) to be determined or predicted by learning the certain target device (e.g, a robot) by using a plurality of learning data.

Examples of the learning algorithm include, but are not limited to, supervised learning, unsupervised learning, semi-supervised learning, or reinforcement learning.

Although operations in the flowcharts of the accompanying drawings are illustrated in the order indicated by arrows, it should be understood that these operations are not necessarily executed in the order indicated by the arrows.

Unless otherwise specified herein, the execution of these operations is not limited to a strict order and may be performed in other orders.

Also, at least some operations in the flowcharts of the accompanying drawings may include a plurality of sub-operations or a plurality of methods. These sub-operations or methods need not necessarily be performed concurrently and may be executed at different times. Furthermore, the sub-operations or methods do not necessarily have to be sequentially performed, and may be performed alternately with at least some of sub-operations of other operations or other methods.

The present disclosure provides a method of estimating a pose of a device. After a similar key frame is searched for in a key frame set through a current frame collected by the device, data-related information between image frames may be obtained based on a feature matching relationship between the current frame and the similar key frame, and the pose of the device may be obtained based on the data-related information. By implementing the method, the data-related information between the image frames may be accurately retrieved through the feature matching relationship between the current frame and the similar key frame. Therefore, the method of estimating a pose of a device, provided in the present disclosure, may improve the robustness of image frame tracking and improve the accuracy and calculation speed of the pose estimation.

In another aspect, the method of estimating a pose of a device, provided in the present disclosure, may include obtaining a similar key frame similar to a current frame from a key frame set by using a global feature extracted from the current frame or by using the extracted global feature and a local feature. The method may effectively improve feature representation performance by performing image search through a global feature or a combination of a global feature and a local feature. Based on this, when the processing of performing inter-frame sequence tracking on the current frame is combined with the above-mentioned method, the accuracy of the device pose estimation may be improved.

In another aspect, the method of estimating a pose of a device, provided in the present disclosure, may include obtaining a similar key frame similar to a current frame, collected by the device from a key frame set, by adopting an image feature extraction model. In this case, the image feature extraction model performs joint learning on a global feature and a local feature in a learning process. The learning method may improve performance in mutual learning in a process in which the model learns and extracts a global feature and a local feature, and may improve the expression performance of the global and local feature extracted by the model.

Performing image search based on a global feature and a local feature extracted by the image feature extraction model provided in the present disclosure may also effectively improve image search accuracy. That is, embodiments of the present disclosure may improve the accuracy of obtaining a similar key frame similar to the current frame collected by the device from the key frame set.

In another aspect, in the learning process of the image feature extraction model provided in the present disclosure, when there is only a first image, a second image may be obtained by performing rotation flip processing on the first image to thereby obtain a first image of global feature learning, and at the same time, paired image blocks for local feature learning may be built based on the second image (a pair of local feature obtained based on a local feature of the first image and a conjugate rotation-flipped local feature of the second image). The learning method may build data necessary for global feature learning and local feature learning without additional learning data, and may reduce a model learning cost.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of estimating a pose of a device, the method comprising:
   identifying a similar key frame that is similar to a current frame collected by the device from a key frame set, through an image feature extraction model that is trained by obtaining a global feature and a first set of local features from an original training image, obtaining a second set of local features from a modified training image that is acquired by modifying the original training image, creating a local feature pair by mapping the first set of local features to the second set of local features through self-supervised learning, and updating parameters of the image feature extraction model based on the global feature, the first set of local features, and the local feature pair;
   obtaining data-related information between image frames based on a feature matching relationship between the current frame and the similar key frame; and
   obtaining the pose of the device based on the data-related information.

2. The method of claim 1, wherein the identifying of the similar key frame comprises:
   determining a first similarity between each key frame in the key frame set and the current frame based on the global feature of the current frame;
   determining a second similarity between each key frame in the key frame set and the current frame based on the first set of local features of the current frame; and
   identifying the similar key frame based on the first similarity and the second similarity.

3. The method of claim 1, wherein the obtaining of the data-related information comprises:
   performing inter-frame feature matching on the current frame to obtain first data-related information between the image frames; and
   updating the first data-related information based on the feature matching relationship between the current frame and the similar key frame to obtain second data-related information between the image frames.

4. The method of claim 3, wherein the first data-related information includes a matching relationship between features of the image frames, and
   wherein the updating the first data-related information comprises:
      determining whether the features of the image frames are same features based on the feature matching relationship between the current frame and the similar key frame;
      combining the same features based on a result of the determination; and
      updating the first data-related information to obtain the second data-related information, based on the combined same features.

5. The method of claim 1, further comprising:
   obtaining the first set of local features and the global feature of the original training image through the image feature extraction model;
   performing a conjugate rotation flip on the second set of local features of the modified image to obtain a conjugate rotation-flipped local feature of the modified training image;
   obtaining the local feature pair based on the first set of local features of the original training image and the conjugate rotation-flipped local feature of the modified training image; and
   updating the parameters of the image feature extraction model based on the local feature pair and the global feature.

6. The method of claim 1: wherein the image feature extraction model comprises a first image feature extraction model and a second image feature extraction model, and
   wherein identifying the similar key frame comprises:
      obtaining the first set of local features and the global feature by inputting the original training image into the first image feature extraction model; and obtaining the local feature pair by inputting the modified training image into the second image feature extraction model and pairing the first set of local features with the second set of local features obtained from the second image feature extraction model.

7. An apparatus for estimating a pose of a device, the apparatus comprising:
a memory storing computer readable instructions; and
at least one processor configured to execute the computer readable instructions to:
identify a similar key frame that is similar to a current frame collected by the device from a key frame set, through an image feature extraction model that is trained by obtaining a global feature and a first set of local features from an original training image, obtaining a second set of local features from a modified training image that is acquired by modifying the original training image, creating a local feature pair by mapping the first set of local features to the second set of local features through self-supervised learning, and updating parameters of the image feature extraction model based on the global feature, the first set of local features, and the local feature pair;
obtain data-related information between image frames based on a feature matching relationship between the current frame and the similar key frame; and
obtain the pose of the device based on the data-related information.

8. The apparatus of claim 7, wherein the at least one processor is further configured to:
determine a first similarity between each key frame in the key frame set and the current frame based on the global feature of the current frame;
determine a second similarity between each key frame in the key frame set and the current frame based on the first set of local features of the current frame; and
identify the similar key frame based on the first similarity and the second similarity.

9. The apparatus of claim 7, wherein the at least one processor is further configured to:
perform inter-frame feature matching on the current frame to obtain first data-related information between the image frames; and
update the first data-related information based on the feature matching relationship between the current frame and the similar key frame to obtain second data-related information between the image frames.

10. The apparatus of claim 9, wherein the first data-related information includes a matching relationship between features of the image frames, and
wherein the at least one processor is further configured to:
determine whether the features of the image frames are same features based on the feature matching relationship between the current frame and the similar key frame;
combine the same features based on a result of the determination; and
update the first data-related information to obtain the second data-related information, based on the combined same features.

11. The apparatus of claim 7, wherein the at least one processor is further configured to:
obtain the first set of local features and the global feature of the original training image through the image feature extraction model;
perform a conjugate rotation flip on the second set of local features of the modified training image to obtain a conjugate rotation-flipped local feature of the modified training image;
obtain the local feature pair based on the first set of local features of the original training image and the conjugate rotation-flipped local feature of the modified training image; and
update the parameters of the image feature extraction model based on the local feature pair and the global feature.

12. A non-transitory computer-readable storage medium storing a program that is executable by at least one processor to perform a method of estimating a pose of a device, the method comprising:
identifying a similar key frame that is similar to a current frame collected by the device from a key frame set, through an image feature extraction model that is trained by obtaining a global feature and a first set of local features from an original training image, obtaining a second set of local features from a modified training image that is obtained by modifying the original training image, creating a local feature pair by mapping the first set of local features to the second set of local features through self-supervised learning, and updating parameters of the image feature extraction model based on the global feature, the first set of local features, and the local feature pair;
obtaining data-related information between image frames based on a feature matching relationship between the current frame and the similar key frame; and
obtaining the pose of the device based on the data-related information.

13. The non-transitory computer-readable storage medium of claim 12, wherein the identifying of the similar key frame comprises:
determining a first similarity between each key frame in the key frame set and the current frame based on the global feature of the current frame;
determining a second similarity between each key frame in the key frame set and the current frame based on the first set of local features of the current frame; and
identifying the similar key frame based on the first similarity and the second similarity.

14. The non-transitory computer-readable storage medium of claim 12, wherein the obtaining of the data-related information comprises:
performing inter-frame feature matching on the current frame to obtain first data-related information between the image frames; and
updating the first data-related information based on the feature matching relationship between the current frame and the similar key frame to obtain second data-related information between the image frames.

15. The non-transitory computer-readable storage medium of claim 14, wherein the first data-related information includes a matching relationship between features of the image frames, and
wherein the updating the first data-related information comprises:
determining whether the features of the image frames are same features based on the feature matching relationship between the current frame and the similar key frame;
combining the same features based on a result of the determination; and updating the first data-related information to obtain the second data-related information, based on the combined same features.

16. The non-transitory computer-readable storage medium of claim 15, wherein the method further comprises:
obtaining the first set of local features and the global feature of the original training image through the image feature extraction model;
performing a conjugate rotation flip on the second set of local features of the modified training image to obtain a conjugate rotation-flipped local feature of the modified training image;
obtaining the local feature pair based on the first set of local features of the original training image and the conjugate rotation-flipped local feature of the modified training image; and
updating the parameters of the image feature extraction model based on the local feature pair and the global feature.

* * * * *